United States Patent [19]

Hon

[11] 4,418,413
[45] Nov. 29, 1983

[54] CHEMICAL LASER INHIBITED FOR PULSED OUTPUT

[75] Inventor: John F. Hon, Tarzana, Calif.

[73] Assignee: Rockwell International Corporation, El Segundo, Calif.

[21] Appl. No.: 418,928

[22] Filed: Sep. 16, 1982

Related U.S. Application Data

[63] Continuation-in-part of Ser. No. 154,733, May 29, 1980, abandoned.

[51] Int. Cl.³ .............................................. H01S 3/095
[52] U.S. Cl. ...................................... 372/89; 372/55; 372/60; 372/95; 372/98; 372/10
[58] Field of Search ....................... 372/89, 55, 58, 60, 372/95, 103, 98, 10, 19

[56] References Cited

U.S. PATENT DOCUMENTS

| | | | |
|---|---|---|---|
| 3,626,322 | 12/1971 | Strouse et al. | 378/89 |
| 3,893,045 | 7/1975 | Jacobson et al. | 372/55 |
| 4,360,923 | 11/1982 | Thayer et al. | 372/89 |

Primary Examiner—James W. Davie
Assistant Examiner—Leon Scott, Jr.
Attorney, Agent, or Firm—H. Fredrick Hamann; Harry B. Field

[57] ABSTRACT

A laser cavity 15 is continuously flown through by a gas such as metastable iodine and other reactants, but continuous wave lasing is inhibited, except for brief periods to obtain pulsating emission of radiation; the optical energy content of the gas in the cavity 15 is, thus, depleted, and fresh gas flows into the cavity 15 during the pause following each pulse.

7 Claims, 4 Drawing Figures

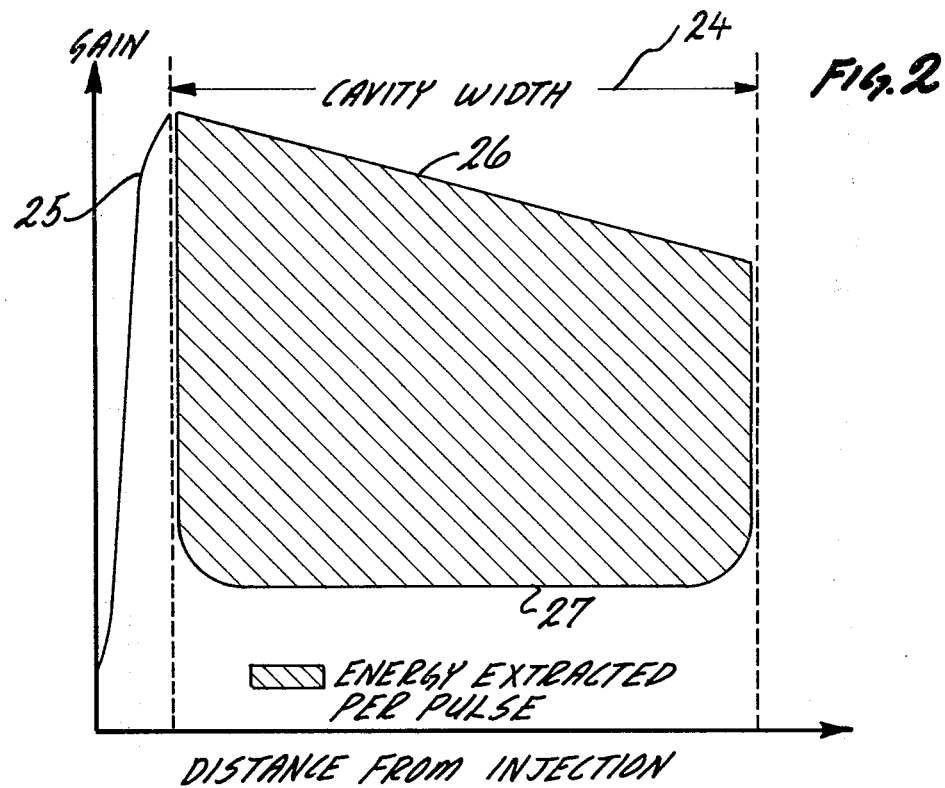
Fig. 2
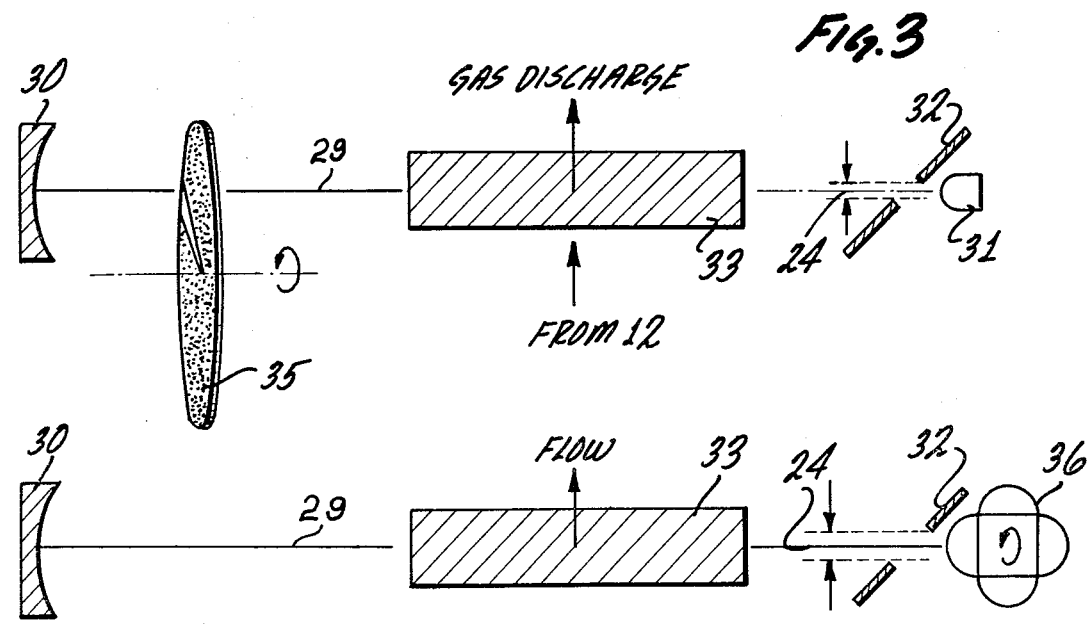
Fig. 3
Fig. 4

CHEMICAL LASER INHIBITED FOR PULSED OUTPUT

This application is a continuation-in-part of copending application Ser. No. 154,733, filed May 29, 1980, by John F. Hon, and abandoned on Dec. 14, 1982.

BACKGROUND OF THE INVENTION

1. Field of the Invention

The present invention relates to chemical lasers; and more particularly, the invention relates to improvements in the operation of such lasers.

2. Description of the Prior Art

Conventional lasers can be divided, for example, into two groups or classes: pulsed lasers and continuous wave lasers. The line of division depends upon the mode and manner of developing in the lasing medium the requisite energy for the lasing action. Early lasers were usually pulsed lasers. By one mechanism or another, usually through application of an electric field or an equivalent source of energy, the lasing medium was "charged" or "pumped" to an "active" or "metastable" state for a certain period of time, followed by a lasing action amounting to an energy "discharge", also lasting for a certain period of time, and so forth, in periodic sequence.

A continuous wave laser, on the other hand, is usually based on a mechanism in which the extraction of optical energy from the active lasing medium as well as the pumping of that medium for transferring energy to the molecules thereof are continouous processes. This overlap and coincidence of pumping and extraction is not necessarily carried out concurrently on the same portions of the medium. Rather, pumping may be carried out in one space or chamber, and the pumped medium may then be transferred to the laser resonant cavity for energy extraction. Take, for example, a chemical laser; the medium here is prepared by continuous chemical reactions, at least some of which occur outside the resonant cavity. The medium flows from the chemical reaction chamber into the resonant cavity, and the metastable state for lasing is established continuously within the resonant cavity. The chemical reaction, the resonant cavity pumping process, and consequently the lasing process, do all occur continously, but at least in parts in different locations.

Recent developments in the field of laser engineering have shown that more powerful lasers will depend upon chemical reactions for obtaining the metastable state at a sufficiently high density and in sufficiently large volume. On the other hand, it was found that energy transfer by means of a laser beam is more efficient when carried out on a pulsating basis rather than by continouous waves.

OBJECTS OF THE INVENTION

It is an object of the present invention to provide a new and improved chemical laser which is operated in a pulsating mode.

It is another object of this invention to provide means for inhibiting laser action in a continuous wave laser in order to provide a pulsed output therefrom.

It is another object of this invention to provide means for optimizing the energy contained in the output pulses of an inhibited continuous wave laser wherein the lasing medium flows at subsonic speed.

It is still another object of this invention to provide a chemical laser wherein resonance is established periodically in an optical cavity thereof.

SUMMARY OF THE INVENTION

In accordance with the preferred embodiment of the invention, an active lasing medium is flowed into a resonant laser cavity during a first time period and continuous wave lasing is inhibited therein during a substantial portion of that first period. The first period is followed by a second period in which lasing is permitted for obtaining the generation of a laser pulse which, in turn, is followed by a period of time during which lasing is again inhibited and the process repeated. That is, a first time period is established to provide gain to the medium and to have the medium retain such gain until lasing occurs during a second time period.

In order to optimize the efficiency of the laser an uninterrupted period of inhibition of laser action should not be longer than it takes to refill the resonant cavity. Also, the most powerful pulses will be produced when lasing is permitted only briefly after the resonant cavity has been completely replenished. The peak power in these pulses will be controlled by kinetic processes. A shorter pulse rate will produce less powerful pulses as some of the exhausted medium will still be in the resonant cavity when the respective next laser pulse is produced.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

FIG. 2 is a graph explaining the development of gain and optical energy in such a laser; and FIG. 3 is a schematic diagram of one device for obtaining pulsation control in a laser as shown in FIG. 1.

FIG. 4 is a schematic diagram of another device for obtaining pulsation control in a laser as shown in FIG. 1.

DESCRIPTION OF THE PREFERRED EMBODIMENT

Figure 1:
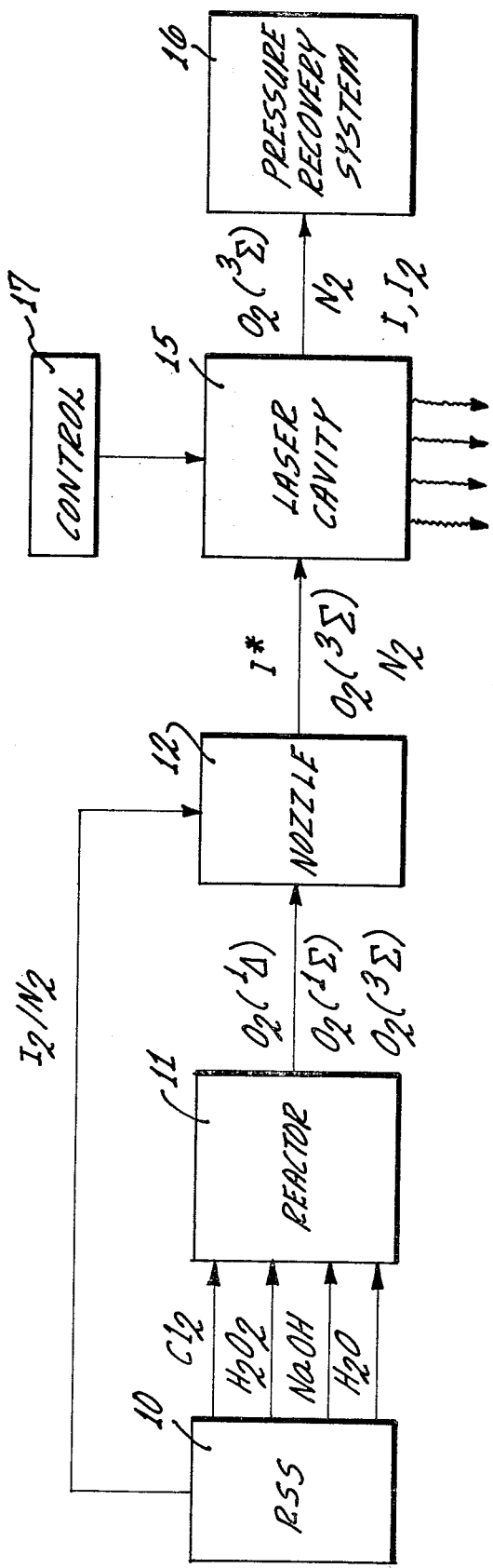
FIG. 1 is a schematic block diagram of an example for practicing the invention in accordance with a particular type of chemical laser.

Proceeding now to the detailed description, FIG. 1 shows, generally, a reactor supply system 10 which includes separate sources for chlorine, hydrogen-peroxide, sodium-hydroxide, water and a mixture of iodine and nitrogen at a mol-ratio of 1:10. These compounds, except for the nitrogen/iodine, are fed into a reactor 11, in which they produce molecular oxygen and other products. Most importantly, the oxygen is an energized state $O_2(^1\Delta)$, whereby two such molecules, when colliding, produce different states in accordance with the relation of $$O_2(^1\Sigma) + O_2(^1\Delta) \rightarrow O_2(^1\Sigma) + O_2(^3\Sigma).$$

Thus, a diluted mixture of $O_2(^1\Delta)$, $O_2(^1\Sigma)$, and $O_2(^3\Sigma)$ is fed to a nozzle system 12 as is commonly used for and in chemical lasers and interspersed with nozzles to which the $I_2/N_2$ mixture is fed.

The nozzle system 12 feeds a resonant laser cavity 15, whereby, upon confluence of these mixtures, atomic iodine is produced as per the reaction $$O_2(^1\Sigma) + I_2 \rightarrow 2I + O_2(^3\Sigma).$$

This is followed by (and concurs with) a reaction of $$O_2(^1\Delta) + I \rightarrow I^* + O_2(^3\Sigma).$$

These reactions provide an inversion between $I^*$ and $I^\circ$, which can then be utilized in a laser reaction $$\nu + I^* \rightarrow 2\nu + I^\circ$$

whereby $\nu$ is a photon having a wave length of 1.315 m. These reactions require, however, that there be sufficient $O_2(^1\Delta)$, such that $$O_2(^1\Delta) \geq 0.17 O_2(^3\Sigma).$$

The reactants, including iodine and oxygen at the indicated levels of excitation, comprise the lasing medium which flows through the laser chamber and resonant cavity 15 at subsonic speed and is discharged into a pressure recovery system 16 to maintain a low pressure. In accordance with the invention, the laser may be capable of continuous wave laser action but is operated in a pulsating mode, as schematically indicated by control box 17. This box provides a so-called Q-switching operation: it causes periodic lasing action, alternating with periods of inhibition.

It is, moreover, of significance that the lasing medium has a particular residence time in resonant cavity 15, which is longer than the time it takes for a quantity of the lasing medium to discharge its optical energy content. The resonant cavity has a certain width 24, and the residence time of any given quantity of lasing medium is given by that width, divided by the flow speed of the medium.

FIG. 2 illustrates the small signal gain distribution for a laser across the width 24 of the resonant cavity, the abscissa being plotted in the direction of gas flow through the resonant cavity, indicated by the vertical, dashed lines. The curve branch 25 has validity outside the resonant cavity just prior to entry and represents, in effect, the gain of the lasing medium measured by the increase in $I^*$ population. As the reactants meet on discharge by the nozzle system 12 (FIG. 1), branch 26 indicates the available gain across the resonant cavity which shows some decline on account of collisional relaxation and spontaneous emissions without avalanche-like reinforcement of laser oscillations in the resonant cavity. Thus, curves 25 and 26 can also be interpreted as an optical gain profile along the direction of medium flow through the resonant cavity under the inhibited lasing condition. If, however, the Q-switch shutter operation or the like permits oscillations, the latent gain drops down to the threshold gain level 27. The cross-hatched area, therefore, represents the energy that can be extracted per pulse.

It should be noted that the slope of curve 26 depends upon the ability of the particular reactant to maintain the active state. Some reactants may return to the threshold gain level 27 much faster than the $I^*$ of the preferred embodiment. In that event, lasing must occur more frequently or potentially extractable energy will be lost. The reactants are chosen such that the active medium retains a large percentage of the gain imparted thereto until lasing is allowed. Optimum operations are then obtained if the laser is inhibited for the period it takes new gas to flow from the left-hand boundary to the right-hand boundary of the resonant cavity. Of course, one may pulse the laser anew earlier, which of course will produce more pulses, each of lower energy, per unit of time. Pulsing the laser less frequently is also possible but wastes energy.

In order to extract the optimum amount of energy from the resonant cavity 15, therefore, the reactants and the velocity thereof must be chosen so that the amount of gain lost during passage of the lasing medium into resonant cavity 15 is within acceptable limits while allowing the reactants to move across the width of the resonant cavity. Lasing should occur at time intervals determined by the time required for such passage. FIGS. 3 and 4 illustrate schematically two of a variety of different methods to obtain pulse mode operation by way of such Q-switching.

FIG. 3 illustrates an example of an unstable laser cavity being comprised of a first concave mirror 30 and a second confocal convex mirror 31 opposingly aligned in first and second planes approximately transverse to central axis 29 of chamber 33, and a scraper mirror 32 situated therebetween. Axis 29 coincides with the central axis of cavity 15. The lasing medium is injected into chamber 33 by the nozzles 12 (FIG. 1). Q-switching is obtained by means of a simple rotating shutter 35 having an opaque portion and a transparent portion, the latter covering, for example, about 1/100 of the circumference to produce a 1:100 pulse-to-nonpulse ratio. Absent such Q-switching, continuous wave lasing would result from the introduction of the previously described oxygen and iodine molecules into resonant cavity 15. It is assumed that the time for shutter 35 to revolve is about equal to the time it takes any given increment of lasing medium to traverse the effective resonant cavity width 24. Of course, the shutter speed and the angular width ratio of opaque and transparent sectors as well as the number of transparent sectors may vary, as will be explained below. Generally speaking, the total transparent portion of the shutter is significantly smaller than the opaque portion of some applications.

FIG. 4 is another example of Q-switching. The laser is similar to the laser of FIG. 3 in that it also includes the concave mirror 30 oriented in a plane transverse to axis 29 of laser chamber 33 and the scraper mirror 32. In addition, this laser has a modified second cavity boundary. FIG. 4 illustrates a particular convex mirror configuration 36, comprising of four spherical portions rotating on an axis transverse to the plane of the drawing. Thus, this particular mirror assembly completes a resonant cavity in but a few positions, being maintained in each instance for a short duration. The same considerations of medium velocity and the ability of the particular reactants to maintain a metastable state apply to the laser of FIG. 4. The difference between the lasers of FIG. 4 and FIG. 3 is that the device of FIG. 4 is not an inhibited continuous wave laser but rather a laser wherein resonance may occur only during certain defined periods. One may employ here a Maltesian wheel so that the mirror assembly is briefly in a stationary position when one of its mirrors is oriented in a plane substantially transverse to the axis 29 of chamber 33 and thus completes the resonant cavity for lasing.

Generally speaking, as far as all of the applicable Q-switching methods are concerned, the laser is inhibited most of the time, and lasing is permitted only during short periods. If one assumes that the combined gas flows from nozzles 12 have a velocity in the order of $10^4$ cm/sec, and if one assumes further that the optically effective width 24 of the resonant cavity 15 has a dimension of about 10 cm in the direction of the gas flow, every $10^{-3}$ seconds the content of that cavity is completely renewed. Assuming further that sufficient reactant molecules are able to maintain a metastable state for the required $10^{-3}$ seconds, optimum use of the available energy may be made by pulsing the laser every $10^{-3}$ seconds, i.e., at a 1 kHz rate.

The duration of each pulse is determined by kinetic processes in the lasing medium. This will be about a period of $10^{-5}$ seconds. Leaving the resonant cavity 15 uninhabited for a longer period of time is unnecessary and is wasteful to the extent that new active medium flows into resonant cavity 15 prior to inhibition of the laser activity. In the assumed example, the 1 kHz pulse rate results in an optimum energy output per pulse. Twice that rate will produce a pulse each time that only half of the resonant cavity's contents has been refilled, and the energy output per pulse is about half, accordingly. Thus, a higher pulse rate is not necessarily wasteful, but the amplitude or magnitude of each pulse is lower. However, one may be compelled to use a higher pulse rate if the charge gain state, prior to spontaneous emission, is not maintainable in sufficient quantity during the residence time in resonant cavity 15. In other words, if the decline of curve branch 26 is too steep, the pulse rate must be increased. The iodine/oxygen laser as described is, indeed, capable of maintaining the metastable state for a millisecond, or even longer, and for sufficient quantities of molecules.

The invention has been described with reference to a particular chemical laser. The invention is applicable, however, to all of the chemical lasers operating with a flow speed which is relatively slow. One can readily say that the inventive method is applicable to chemical lasers having a subsonic flow field. On the other hand, the invention is either not applicable or is at least impractical in those cases in which the residence time of lasing material in the resonant cavity 15 equals (or is even shorter than) a pulse duration. In other words, whenever the residence time becomes so short that, on a statistical average, it will just about discharge its latent optical energy when flowing through, pulse operation, in fact, merges necessarily into a continuous wave transmission, unless a potentially substantial waste of available energy is acceptable for one reason or another.

The invention is not limited to the embodiments described above; but all changes and modifications thereof, not consituting departures form the spirit and scope of the invention, are intended to be included.

What is claimed and desired to be secured by Letters Patent of the United States is:

1. A chemical laser having a resonant cavity extending along an axis and means for extracting energy from said cavity in periodic pulses, comprising:
    an active lasing medium including at least one component having an obtainable metastable state and resulting from at least one chemical reaction between gases, wherein a majority of molecules in said component are charged to said metastable state and capable of continuous wave lasing;
    means for introducing said active lasing medium into said resonant cavity in a continuous subsonic flow and in a direction transverse to said axis; and
    means for periodically inhibiting continuous wave lasing of said component in said resonant cavity wherein said means for periodically inhibiting continuous wave lasing comprises means for periodically causing said cavity to become non-resonant.

2. The chemical laser of claim 1 wherein the period of inhibiting continuous wave lasing is determined by the width of said resonant cavity divided by the speed of said subsonic flow.

3. The chemical laser of claim 1 wherein said means for periodically causing said cavity to become non-resonant comprises means for placing an opaque shutter across said cavity in a plane oriented transverse to said axis.

4. The chemical laser of claim 1 wherein said cavity comprises first and second opposed mirrors aligned in respective first and second planes approximately transverse to said axis and said means for periodically inhibiting continuous wave lasing comprises periodically moving said second mirror out of said second plane.

5. A chemical laser including a cavity for receiving an active laser medium wherein said cavity has a central axis, comprising:
    means for periodically producing resonance in said cavity including a first mirror oriented in a plane approximately transverse to said axis, a second movable mirror and means for periodically orienting said second mirror in a plane approximately transverse to said axis;
    means for flowing an active lasing medium into said cavity, said medium comprising a plurality of gases including at least one gas component having an obtainable metastable state resulting from at least one chemical reaction between gases, whereby the majority of the molecules in said gas component are capable of maintaining said metastable state during a subsonic transit across the width of said cavity; and
    means for Q-switching said active lasing medium at periods determined by the time required for said medium to transit said cavity.

6. The chemical laser of claims 1 or 5 wherein said active lasing medium comprises oxygen and iodine.

7. A method of operating a chemical laser wherein reactants comprising molecules of oxygen and iodine are fed into a resonant cavity to establish a metastable state for some of said molecules as fed into said cavity, comprising the steps of:
    inhibiting continuous wave laser action in said cavity until said cavity is substantially filled;
    causing laser action to develop in said cavity after a period of inhibition substantially equal in length to the period of time required to restore the content of said reactants in said cavity; and
    causing said laser action to continue for a period of time substantially equal to the time required for said molecules in said metastable state to revert to a stable state.

* * * * *